Feb. 29, 1944.　　J. B. ARMITAGE　　2,342,829
MILLING MACHINE
Filed Sept. 22, 1939　　5 Sheets-Sheet 1

Fig. 1

INVENTOR
JOSEPH B. ARMITAGE
BY W. D. O'Connor
ATTORNEY

Feb. 29, 1944.   J. B. ARMITAGE   2,342,829
MILLING MACHINE
Filed Sept. 22, 1939   5 Sheets-Sheet 2

INVENTOR
JOSEPH B. ARMITAGE
BY W. D. O'Connor
ATTORNEY

Patented Feb. 29, 1944

2,342,829

UNITED STATES PATENT OFFICE 2,342,829

MILLING MACHINE

Joseph B. Armitage, Wauwatosa, Wis., assignor to Kearney & Trecker Corporation, West Allis, Wis., a corporation of Wisconsin Application September 22, 1939, Serial No. 296,003

20 Claims. (Cl. 90—17)

The invention relates generally to machine tools and more particularly to an improved milling machine.

A general object of the invention is to provide a milling machine of improved construction especially adapted for milling angularly disposed surfaces.

Another object is to provide an improved spindle supporting structure for a milling machine.

Another object is to provide a milling machine having an improved angularly adjustable spindle supporting head.

Another object is to provide improved means for effecting axial adjustment of a tool spindle in a pivotally mounted spindle head.

Another object is to provide an improved movement limiting apparatus for a spindle supporting quill that functions also to prevent rotation of the quill.

Another object is to provide improved clamping means for a spindle carrying quill.

According to this invention, a milling machine is provided with a swiveling head in which a tool spindle is supported by means of an axially adjustable quill. The quill adjusting mechanism includes a nut threaded on the quill exterior and retained in position in the head by means of a collar which is slotted to provide a clamping element. The mechanism for actuating the quill adjusting nut includes gearing and an adjusting hand wheel which is journalled substantially concentric with the pivot axis of the swiveling head in such manner that the hand wheel remains in the same position regardless of the angular position of the head. The quill is provided with a stop rod by means of which it may be stopped at any predetermined position or its position indicated with a high degree of accuracy, the rod functioning also to prevent rotation of the quill in the head. A clamping screw actuated by a lever is arranged to contract the slotted part of the nut retaining collar about the quill to clamp it in adjusted position. When the swiveling head is arranged in compound form to provide for universal adjustment, the quill adjusting nut may be actuated by means of a worm shaft disposed transversely of the spindle and arranged to receive a hand wheel at either end thereof as may be most convenient. Alternatively, the quill adjusting nut may be actuated by means of spur gearing associated with a shaft disposed parallel with the spindle and fitted with a removable adjusting crank at the end of the spindle head opposite from the spindle nose. In this arrangement, the removable adjusting crank also is adapted to engage and serves to actuate the spindle clamping screw.

The invention is exemplified herein by means of a milling machine of the swivel head type, although it is to be understood that the particular embodiment shown is intended to be illustrative only and that various other machine tools may utilize the inventive features in various forms within the range of equivalents of the structures defined in the subjoined claims.

The foregoing and other objects of this invention, which will become more fully apparent from the following detailed specification, may be achieved by the exemplifying apparatus shown in and described in connection with the accompanying drawings, in which:

Fig. 9 is a view in vertical section generally similar to Fig. 7, of another universal head with the spindle turned to vertical position and showing a modified form of spindle adjusting mechanism; and, Fig. 10 is a detail view in transverse section of the spindle clamping mechanism in the universal head, taken on the plane represented by the line 10—10 in Fig. 9.

Figure 1:
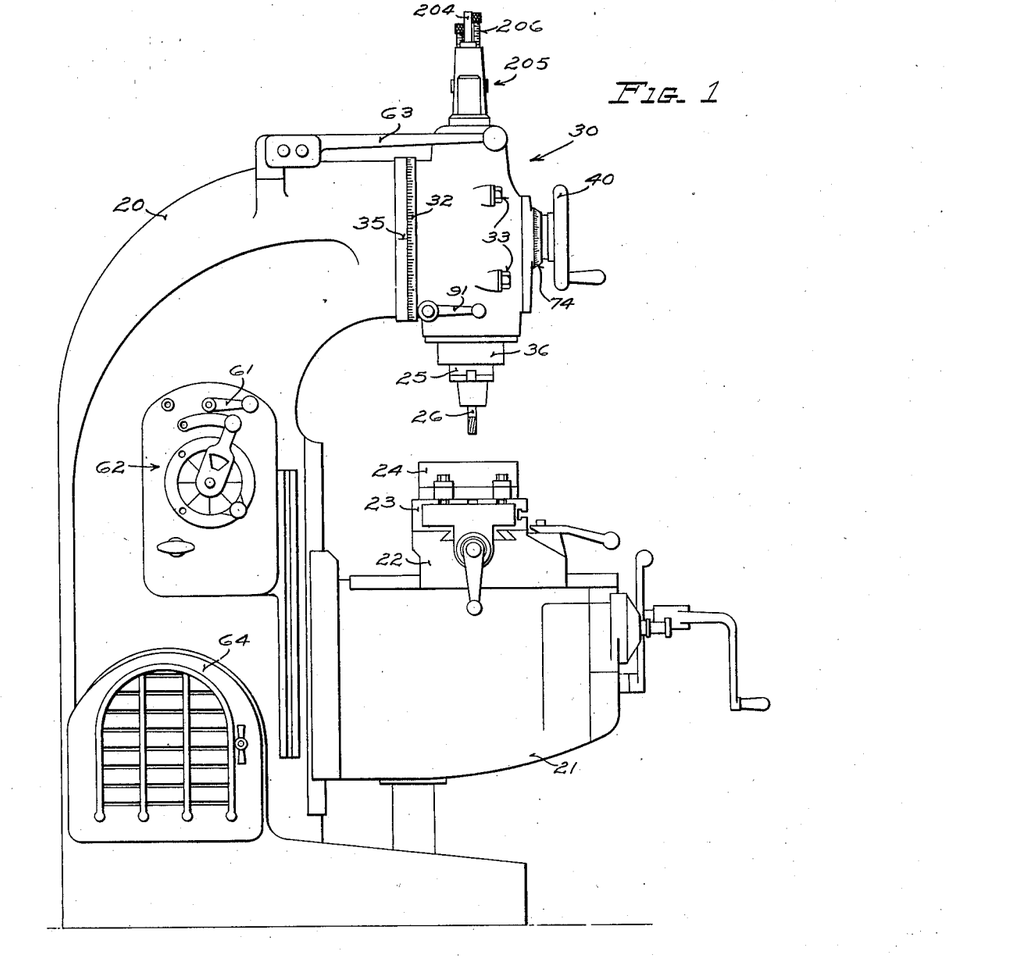
Figure 1 is a general view in left side elevation of a milling machine embodying the present invention.

The machine tool shown generally in Fig. 1 of the drawings as exemplifying structure incorporating a preferred embodiment of the invention, is essentially a milling machine of the swivel head type generally similar in structure to a vertical spindle, knee and column type milling machine, although it is to be understood that the various inventive features may be incorporated in and utilized with advantage in connection with machines of different construction.

Referring more specifically to the drawings, the exemplifying milling machine shown in Fig. 1 comprises essentially a supporting frame or column structure 20 carrying cooperating work supporting and tool supporting elements. The work supporting element includes a knee structure 21 arranged for vertical sliding movement along the front face of the column and carrying a saddle 22 slidably mounted on the top thereof for horizontal transverse movement toward or from the column. The saddle 22, in turn supports a work carrying table 23 that is slidably mounted thereon for horizontal longitudinal movement, the arrangement being such that a workpiece 24 mounted on the table 23 may be moved along any one of three mutually transverse paths in well known manner.

Figures 2, 3, 4:
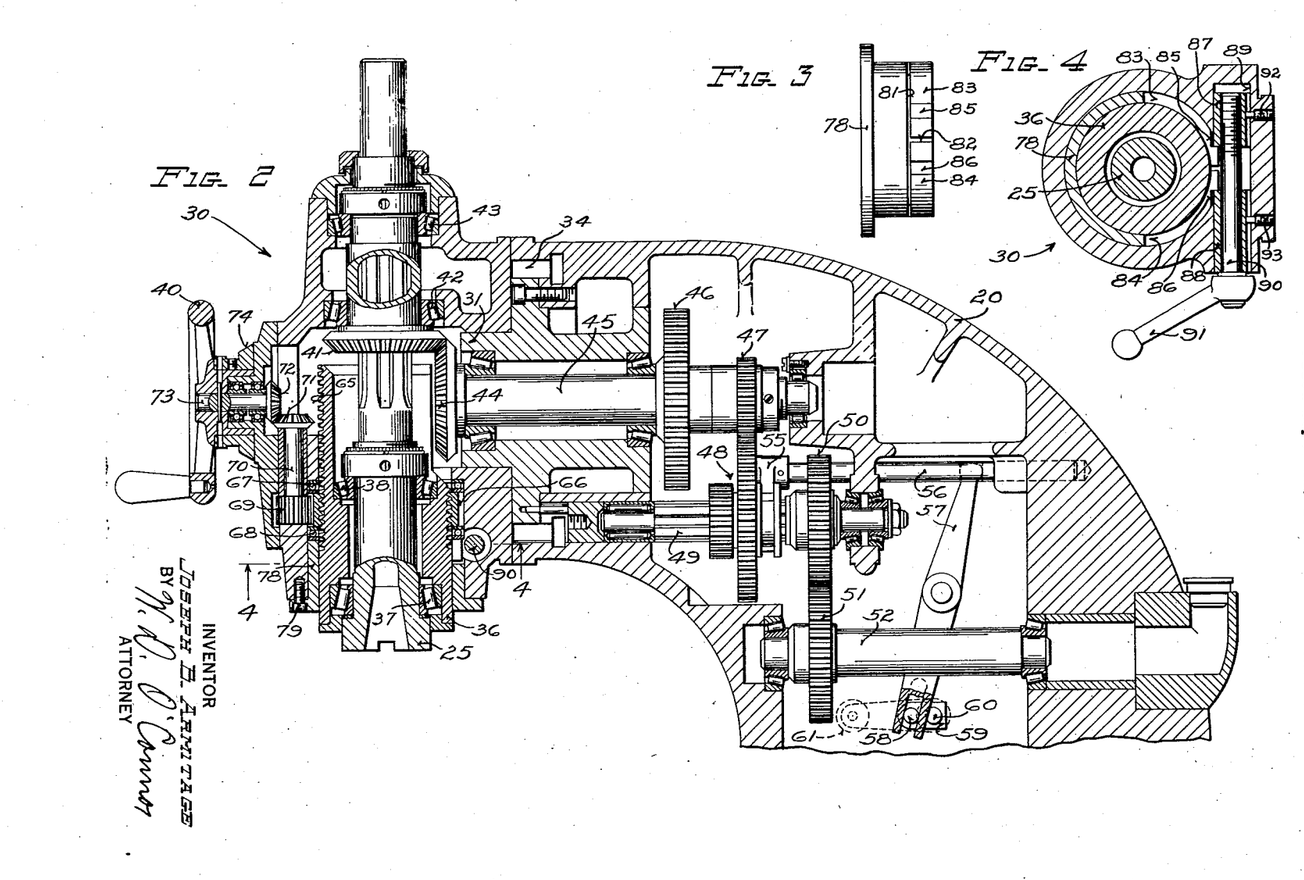
Fig. 2 is a view in vertical longitudinal section through the upper part of the milling machine shown in Fig. 1, taken on the plane represented by the line 2—2 in Fig. 5.
Fig. 3 is a detail view in side elevation of a clamping collar for maintaining the milling machine spindle quill in adjusted position.
Fig. 4 is a detail view of the quill clamping mechanism, taken in horizontal section on the plane represented by the line 4—4 in Fig. 2.

The tool supporting element is disposed above the work carrying table 23 and includes a tool carrying spindle 25 arranged to drive a rotary milling cutter 26 in cooperating relationship with the workpiece 24 on the table 23. As appears in Figs. 1, 2 and 5, the cutter supporting spindle 25 is carried by a spindle supporting member on head 30, which is pivotally mounted on the machine frame 20 for angular adjustment or swiveling movement in a vertical plane disposed longitudinally of the table 23. As shown in Fig. 2, the spindle head 30 is rotatably mounted on a projecting boss 31 at the upper, forward end of the column 20 disposed to provide a horizontal axis, an angular scale 32 being provided on the head for indicating its angular position in cooperation with a reference mark 35 (shown in Fig. 1) on the column. After the head 30 has been adjusted angularly, it may be clamped to the column 20 in adjusted position by tightening four clamping bolts 33 that engage a circular T slot 34 in the forward end of the column and project through the front of the head.

Figure 5:
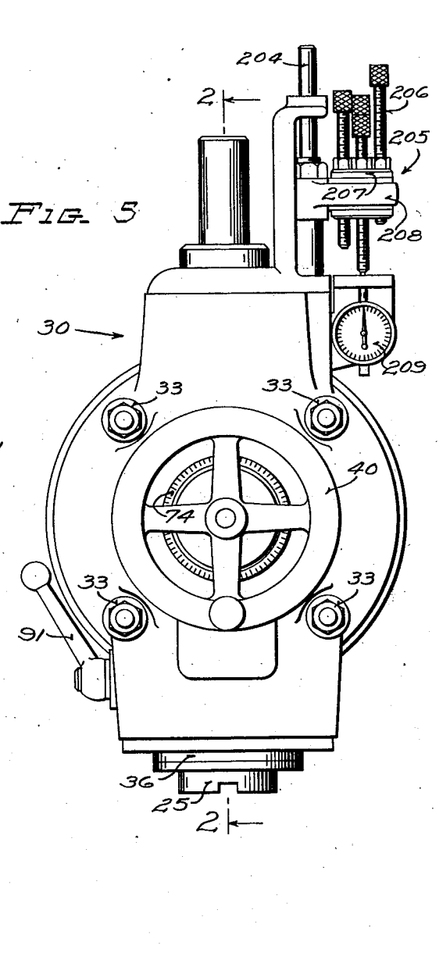
Fig. 5 is an enlarged view in front elevation of the swivel head constituting part of the machine shown in Fig. 1.

As best shown in Fig. 2, the tool carrying spindle 25 in the swiveling head 30 is rotatably mounted transversely of the axis of pivotal movement in an axially adjustable quill 36 by means of anti-friction bearings 37 and 38. Axial feeding movement or adjustment of the position of the quill and the spindle 25 is effected by turning a quill adjusting member on hand wheel 40 at the front of the head 30, which functions to move the quill within the head. As shown in Figs. 1, 2 and 5, the hand wheel 40 is rotatably mounted on the front of the head 30 at a position substantially coaxial with the pivot center about which the head swivels. By this arrangement, the hand wheel is so disposed that it remains in the same position regardless of the angular position assumed by the head.

The tool spindle 25 may be rotated by power for driving the cutter 26, by means of a bevel gear 41 with which it has splined connection and that is rotatably mounted by means of bearings 42 and 43 in the body of the head 30. The bevel spindle gear 41 is driven by means of a meshing bevel gear 44 rotatably mounted in the column 20 concentric with the pivot axis of the head in such manner that the meshing engagement is maintained regardless of the angular position of the head. As shown, the bevel gear 44 is fixed on the forward end of a driving shaft 45 which is journalled in the column 20 coaxially with the pivot axis of the head, the quill being cut away at one side to provide clearance space for the gear. The shaft 45 carries at its inner end a relatively large gear wheel 46 and a relatively small gear wheel 47 which are disposed to be meshed selectively by complementary gears constituting a sliding couplet 48, the combination forming a range changing mechanism. The couplet 48 is slidably mounted on a splined shaft 49 that is journalled in the column 20 parallel with the shaft 45 and that carries a gear wheel 50. For providing a power driving connection, the gear wheel 50 has meshing engagement with a gear wheel 51 mounted on a driving shaft 52 in the column 20 and constituting part of the usual spindle driving train that is operatively connected to be driven in well known manner.

The range changing gear couplet 48 is engaged by a shifting fork 55 which is carried on a shifting rod 56 slidably mounted in the column. The rod 56 is engaged by one end of a shifting lever or arm 57 pivotally mounted in the column, and which is bifurcated at its other end to receive a crank pin 58. The crank pin 58 is carried by a crank arm 59 fixed on a short control shaft 60 extending through the side of the column and provided at its outer end with a range changing lever 61, as best shown in Fig. 1. The range changing lever 61 may be moved to either of two positions as indicated, to shift the range changing couplet 48, and it functions in cooperation with speed changing and indicating apparatus 62 which controls a speed changer (not shown) constituting part of the spindle driving train. The speed changer is connected to drive the shaft 52 and is arranged to be driven in well known manner by a power source such as a motor or the like housed in the lower part of the column in position to be accessible by opening a door 64 on the side thereof, as shown in Fig. 1. For starting and stopping the spindle, there is provided a clutch lever 63 at the top of the column which functions to actuate a clutch for selectively connecting the power source to the driving train in well known manner.

To provide for moving the spindle 25 axially for feeding the cutter 26 toward or from the workpiece 24, external screw threads 65, are cut in the surface of the quill 36, as shown in Fig. 2. The threads 65 are engaged by complementary internal threads in a quill adjusting or feeding nut 66 which is rotatably mounted in the head 30 by means of ball thrust bearings 67 and 68, the arrangement being such that when the nut 66 is turned in its bearings, the quill 36 is caused to move axially within the head. As shown, the nut 66 is provided on its periphery with spur gear teeth which mesh with the teeth of a quill feeding pinion 69 that is fixed on an actuating shaft 70 journalled in the head parallel with the spindle. In the construction shown in Fig. 2, the feeding shaft 70 is provided at its other end with a bevel pinion 71 that meshes with a complementary bevel pinion 72 on a short actuating shaft 73 which is rotatably mounted in the forward face of the spindle head 30 approximately coaxial with its pivot axis and that projects therethrough to reeceive on its outer end the spindle feeding hand wheel 40. A graduated micrometer dial 74 is associated with the hand wheel 40 for the purpose of indicating the axial position of the spindle.

As best shown in Fig. 2, the quill adjusting nut 66 and its supporting bearings 67 and 68 are retained in the spindle head 30 by means of a retaining collar or sleeve 78 which encircles the quill 36 and is secured to the body of the head 30 by screws 79. A portion of the collar 78 is made resilient in order to be contactable about the quill 36 for clamping it against axial movement in the head. As shown in Figs. 3 and 4, a saw cut or kerf 81 extending half-way across the collar 78 in a radial plane separates a semicircular part from the main body. An axial slot or kerf 82 intersects the kerf 81 at the middle of the separated semicircular part of the collar, dividing it in manner to provide a pair of integral resiliently contractable clamping arms or quadrants 83 and 84 which may be deflected toward each other by closing the kerf 82 to effect a clamping action upon the quill. As best shown in Fig. 4, the clamping arms 83 and 84 are provided respectively with notches 85 and 86 that are engaged by the ends of tubular clamping elements or sleeves 87 and 88 which are slidably mounted in a bore 89 disposed in the spindle head 30 tangentially to the collar 78. The clamping member 87 is threaded internally to receive complementary threads on a clamping rod or clamp shaft 90 which passes through the central opening in the clamping sleeve 88. The clamping shaft 90 is provided on its outer end with a clamp handle or lever 91 by means of which it may be turned within the threaded element 87. A shoulder on the shaft bears upon the outer end of the clamping element 88 in such manner that when the shaft is turned in clamping direction the clamping elements are drawn toward each other and function to deflect the clamping arms 83 and 84 to clamp them upon the exterior of the quill 36. Pins 92 and 93 fitted in the head structure engage longitudinal grooves in the clamping elements 87 and 88 in manner to prevent them from turning with the shaft 90 when the lever 91 is actuated.

In utilizing a machine of the construction described to perform a milling operation, the spindle head 30 may be pivoted to any predetermined angular position, as indicated by the scale 32 and then clamped in the selected position by tightening the clamp bolts 33 to present the milling cutter 26 at a predetermined angle to the workpiece 24. The workpiece may then be brought into engagement with the cutter at the desired position by suitably adjusting the work supporting knee 21, saddle 22 and table 23, as previously explained. The work may be fed to the cutter by actuating the work supporting elements in well known manner, or the cutter may be fed into the work to a predetermined depth along the angular path by actuating the spindle adjusting hand wheel 40, the depth of the cut being determined from the micrometer scale 74. If it is desired to form a plane surface at the predetermined angle, the saddle 22 may be moved along the top of the knee 21 to effect a transverse feeding movement of the workpiece 24 relative to the angularly disposed cutter.

Figure 6:
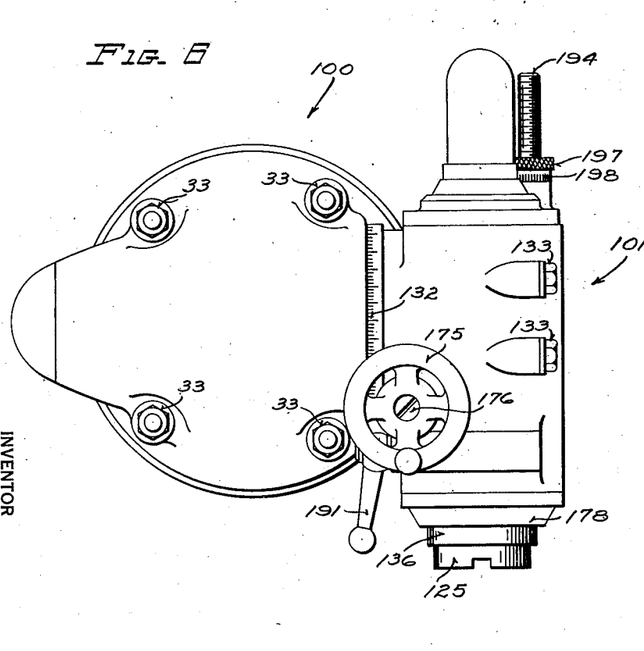
Fig. 6 is a view similar to Fig. 5 but showing an alternative compound swivel head providing for universal movement of the spindle.
Figure 7:
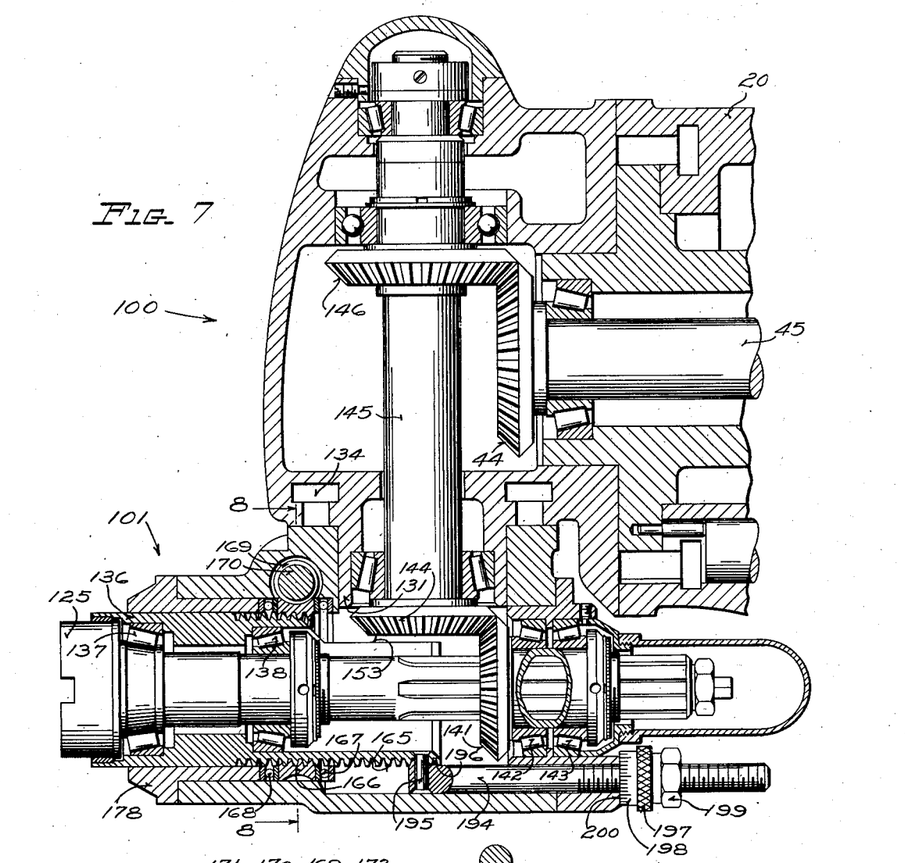
Fig. 7 is a view in vertical longitudinal section generally similar to Fig. 2, showing the universal head illustrated in Fig. 6 with the spindle turned to horizontal position.

In order that means may be provided for adjusting the angular position of the cutting tool in any direction, the spindle head may be of compound form arranged for universal swiveling movement as shown in Figs. 6 and 7. In this construction, there is provided a main head structure 100 adapted to be fitted to the forward end of the column for swiveling movement in a vertical plane, in manner similar to that described in connection with the swivel head 30 shown in Figs. 1, 2 and 5. To provide for a further swiveling movement of the cutting tool in a plane perpendicular to the vertical plane of primary swiveling movement, the main head 100 carries a sub-head 101 in which is rotatably mounted a tool supporting spindle 125. As shown in Fig. 7, the sub-head 101 is rotatably mounted on a boss 131 projecting from the face of the main head 100. The angular position of the sub-head 101 and its spindle 125 relative to the vertical plane of swiveling movement of the main head 100, is indicated by means of an angular scale 132 inscribed on the sub-head and read in connection with a suitable reference mark on the main head. After the sub-head has been adjusted to a predetermined angular position, it may be clamped to the main head by tightening four clamping bolts 133 the inner ends of which operate in a circular T slot 134 in the main head.

Slidably mounted in the sub-head 101 is a spindle carrying quill 136 within which the spindle 125 is rotatably supported by means of bearings 137 and 138, as shown in Fig. 7. The driving connection to the spindle 125 includes a spindle bevel gear wheel 141 that is rotatably mounted in the sub-head 101 by means of bearings 142 and 143, the spindle having splined connection with the gear 141 to permit axial adjustment. The gear 141 is driven by a meshing bevel gear 144 carried on the end of a shaft 145 that is journalled in the main head 100 concentric with the axis of swiveling movement of the sub-head 101. The shaft 145 in the head 100 is provided with a bevel gear 146 which meshes with the bevel gear 44 on the end of the shaft 45 journalled in the column 20 concentric with the pivot axis of the main head 100.

As shown in Fig. 7, the quill 136 is cut away to form a clearance opening 153 at the side thereof adjacent to the bevel gear 144 for the purpose of permitting movement of the quill past the gear. The quill is provided with external screw threads 165 which are engaged by an internally threaded quill feeding nut 166 that is rotatably mounted in the sub-head 101 by means of thrust bearings 167 and 168. In this instance, the quill adjusting nut 166 is provided on its periphery with worm wheel teeth which are engaged by the threads of a worm 169 carried on a worm shaft 170 journalled in the sub-head 101 tangentially to the nut 166.

Figure 8:
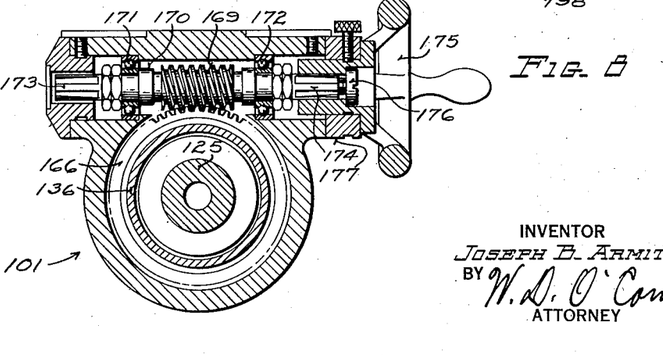
Fig. 8 is a detail view in transverse section through the spindle adjusting mechanism, taken on the plane represented by the line 8—8 in Fig. 7.

As best shown in Fig. 8, the worm shaft 170 is rotatably mounted in anti-friction bearings 171 and 172 and it is provided at each end with tapered splines 173 and 174 respectively. The splined ends of the shaft 170 are adapted to receive a quill feeding hand wheel 175, the arrangement being such that the hand wheel may be applied to either end of the shaft and secured thereto by a screw 176. By this arrangement, the hand wheel may be presented at the side of the sub-head 101 which happens to be most conveniently reached for operation at the particular position in which the sub-head is being used. For determining the position of the spindle 125, the hand wheel 175 is provided with an adjustable graduated micrometer dial 177 arranged to indicate precisely the axial position of the spindle. For retaining the quill adjusting nut 166 and its thrust bearings in the sub-head 101, there is provided a collar 178 disposed to encircle the quill 136. The collar 178 is fitted in the end of the sub-head and is provided with slots to make it resilient in the manner described with regard to the collar 78, the arrangement being such that the collar 178 may be contracted to clamp the quill by actuating a clamping lever 191.

To provide for limiting the forward or outward feeding movement of the spindle 125 at an accurately predetermined position, the sub-head 101 is equipped with an adjustable positive stop device. As shown in Fig. 7, the stop device includes a stop rod 194 that is slidably mounted in the sub-head 101 parallel with the spindle. The stop rod 194 is provided at its inner end with projecting threads 196 which engage the threads 165 on the quill 136, and it is further secured to the quill by a stud or rivet 195 in manner to form a positive connection therewith. Since the stop rod 194 is slidably fitted in the body of the sub-head, it functions also as a key to prevent rotation of the quill. As shown, the stop rod 194 is arranged to project from the end of the sub-head housing opposite that from which the spindle 125 projects, and the projecting end of the rod is threaded to receive a positive stop collar or member 197. The stop collar 197 is provided with a graduated micrometer dial 198 by means of which it may be positioned accurately, and a check nut or lock nut 199 is likewise threaded on the rod 194 in manner to engage the collar for locking it in adjusted position. When the spindle is fed axially in the outward direction by actuating the hand wheel 175, the stop collar 197 moves into engagement with an abutment 200 formed on the spindle head body, and checks the outward movement of the spindle at the predetermined position.

A similar stop rod 204 is likewise provided on the quill 36 of the spindle head 30, the rod functioning also to prevent turning movement of the quill. The stop rod 204 of the spindle head 30 may be similarly equipped with an adjustable positive stop collar and lock nut, or it may be fitted with a multiple position stop device 205, as shown in Figs. 1 and 5. The multiple stop device 205 includes a plurality of individually adjustable stop screws or gauge elements 206 mounted in a revolvable holding member or head 207 that is rotatably mounted in a bracket 208 fixed on the rod 204. By turning the head 207, any one of the screws 206 may be brought into cooperating alignment with the plunger of a sensitive dial indicator 209 mounted on the body portion of the head 30. When the spindle 25 is advanced outwardly by actuating the hand wheel 40, the selected adjusting screw 206 moves into engagement with the indicator plunger and actuates the indicator in manner to show precisely the position of the spindle and the cutter carried by it. In making successive cuts at different predetermined levels, the several adjusting screws 206 are adjusted to correspond with the desired cutting positions and are then revolved successively into position to engage the indicator as one cut after another is completed.

Figures 9, 10:
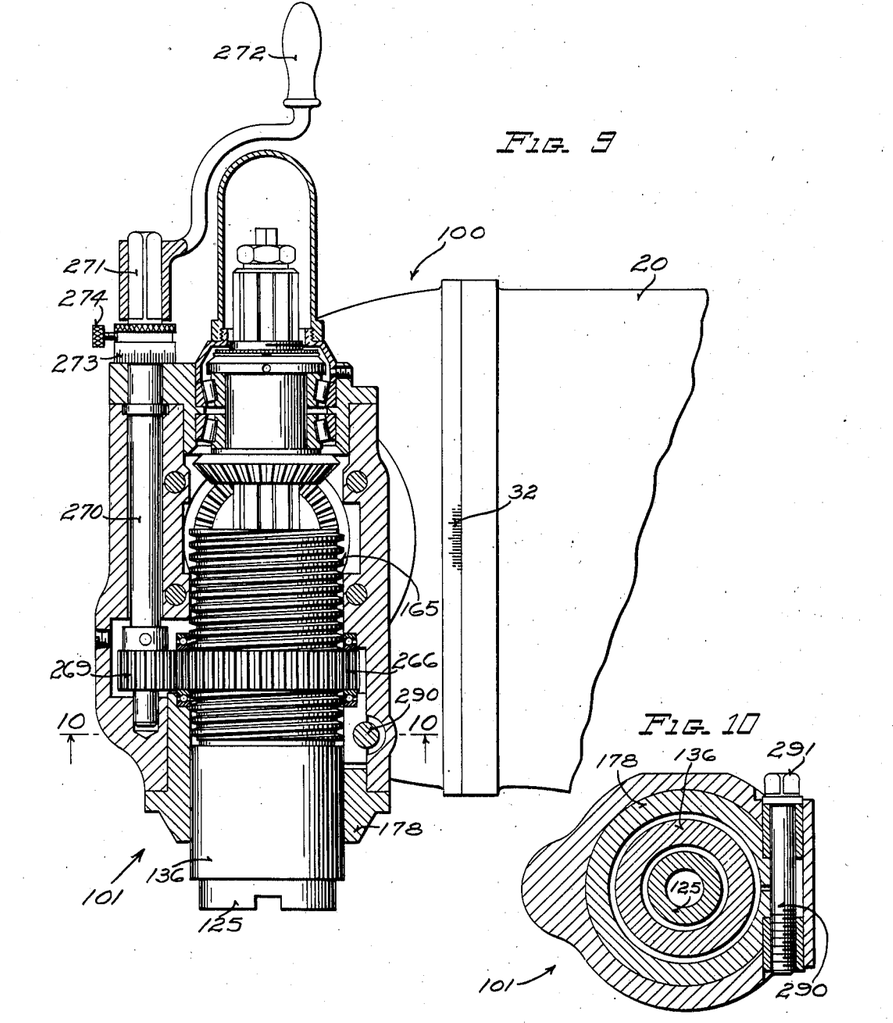

In the modification of the universally adjustable spindle head shown in Fig. 9, the external threads 165 of the quill 136 in the sub-head 101 cooperate with an adjusting nut 266 which is provided with spur teeth on its periphery similar to the teeth on the nut 66 shown in Fig. 2. In this construction, the spur teeth are engaged by a spur pinion 269 on an actuating shaft 270 that is journalled in the body of the sub-head 101 parallel with the spindle 125. As shown, the shaft 270 projects from the body of the sub-head 101 at the end thereof opposite from that at which the spindle nose projects, and the projecting end of the shaft is provided with a squared portion 271 arranged to receive a removable actuating crank 272. To indicate the position of the spindle, the shaft 270 is provided with an adjustable micrometer dial 273 which may be clamped to the shaft, by actuating a clamping screw 274, in position to indicate a predetermined initial setting of the spindle.

As shown in Fig. 10, the resilient clamping collar 178 is in this modification arranged to be contracted by actuating a clamping screw 290. However, instead of a clamping lever, the clamping screw 290 is provided at its actuating end with a square portion 291 that is adapted to receive the removable actuating crank 272, the arrangement being such that the same crank may be used interchangeably for adjusting the position of the spindle and for clamping it in the adjusted position.

From the foregoing descriptions of the several embodiments of the invention disclosed herein, it is apparent that there have been provided improved milling machine structures especially adapted for milling angularly disposed surfaces and particularly arranged for convenient and accurate operation.

Although the disclosed embodiments of the invention have been described in detail for the purpose of fully setting forth operative structures incorporating the invention, it is to be understood that the apparatus herein described is intended to be illustrative only and that the various novel features of the invention may be incorporated in other structural forms without departing from the spirit and scope of the invention as defined in the subjoined claims.

The invention is hereby claimed as follows:

1. In a milling machine, a frame, a tool carrying head pivotally mounted on said frame, a tool spindle rotatably mounted in said head transverse to its axis of pivotal movement and arranged for axial bodily movement therein, a spindle driving shaft rotatably mounted in said frame coaxial with the pivoting movement of said head, means operatively connecting said driving shaft to said spindle to drive it regardless of its axial or angular position, a spindle moving member rotatably mounted on said head coaxial with its pivoting movement, and means operatively connecting said member to said spindle in manner to effect axial movement thereof regardless of the angular position of said head, said spindle moving member remaining always in the same position.

2. A milling machine comprising a frame, a spindle head pivotally mounted on said frame, a spindle quill slidably mounted in said head for movement transversely of the pivotal axis of said head, said quill being provided with external screw threads, a nut presenting internal threads and external teeth rotatably mounted in said spindle head in cooperating relationship with the external threads on said quill, an actuating shaft arranged parallel with said quill, a pinion fixed on said actuating shaft and disposed in meshing engagement with said external teeth on said nut, a hand wheel rotatably mounted on said spindle head in coaxial relationship with the pivotal movement of said head, and gearing operatively connecting said hand wheel to said actuating shaft, the arrangement being such that said hand wheel remains in the same position regardless of the position of said head in its pivoting movement.

3. In a machine tool, a spindle carrying member, a spindle quill slidably mounted in said member, a tool carrying spindle rotatably mounted in said quill, a collar supporting said quill for sliding movement in said member said collar having a resilient portion, and means mounted in said spindle carrying member and operative to contract the resilient portion of said collar upon said quill to clamp it in predetermined position.

4. A spindle carrying structure for a machine tool, comprising a spindle supporting head, a spindle quill presenting external screw threads slidably mounted in said head, a spindle rotatably journalled in said spindle quill, a quill adjusting nut rotatably mounted in said head in cooperating engagement with said screw threads on said quill, a resilient sleeve encircling said quill and secured to said head in position to retain said adjusting nut in predetermined axial relationship with said head, and means on said head arranged to contract said sleeve into clamping engagement with said quill for retaining said spindle in predetermined axial position.

5. In a machine tool, a supporting structure, a spindle carrying quill slidably mounted in said supporting structure, a collar disposed to encircle said quill to retain it in said supporting structure, said collar being slotted to render a portion thereof resilient, and means to contract the resilient portion of said collar to clamp said quill in fixed position in said structure.

6. In a machine tool having a frame, a tool carrying head pivotally mounted on said frame, a spindle quill, a sleeve secured in said head and disposed to slidably receive said spindle quill a portion of said sleeve being resiliently contractable, a tool carrying spindle rotatably mounted in said quill for axial bodily movement therewith, and means mounted in said head and disposed to engage and contract said resilient portion of said sleeve in manner to clamp said quill for establishing said spindle at a predetermined axial position.

7. In a machine tool, a supporting structure, a driving bevel gear carried by said supporting structure, a swivel head mounted concentric with said driving bevel gear, a driven bevel gear journalled in said swivel head in meshing engagement with said driving bevel gear, a tool spindle carried in said head in sliding engagement with said driven bevel gear, a spindle quill slidably mounted in said head and rotatably supporting said tool spindle for axial feeding movement, said quill being cut away at one side to permit movement thereof past said driving bevel gear, a quill moving member rotatably mounted on the front of said swivel head coaxially with its axis of swiveling movement, and means operatively connecting said quill moving member to said quill in manner to provide for effecting axial feeding movement of said spindle, said quill moving member remaining in the same position regardless of the angular position of said head.

8. In a machine tool, a spindle supporting structure including a spindle head, a spindle driving element projecting into one side of said head, a spindle having driving connection with said driving element, a spindle carrying quill slidably mounted in said head and rotatably supporting said spindle, said quill being cut away at one side to admit said spindle driving element, a contractable collar disposed to encircle said quill to retain it in said spindle head, and clamping means disposed to contract said collar upon said quill to clamp it in adjusted position.

9. In a machine tool, a spindle supporting structure including a spindle head, a spindle quill slidably mounted in said spindle head for axial adjustment relative thereto said quill presenting a threaded external surface, a tool carrying spindle rotatably mounted in said quill for bodily axial movement therewith, an adjusting nut cooperating with the threaded exterior of said quill said nut presenting gear teeth on its periphery, means rotatably supporting said adjusting nut in said spindle head including a contractable collar encircling said quill and secured in said head in manner to retain said adjusting nut in predetermined axial position, actuating means arranged to engage the gear teeth on said nut to rotate it for adjusting the axial position of said quill and said spindle, and clamping means arranged to contract said collar upon said quill to clamp it in adjusted position.

10. In a machine tool, a spindle supporting structure including a spindle quill mounted for axial sliding movement said quill being provided with external screw threads, a cooperating quill adjusting nut disposed in threaded engagement with said quill said nut presenting gear teeth on its exterior, means rotatably supporting said nut including a contractable collar disposed to encircle said quill, a pinion disposed in meshing relationship with the gear teeth on said nut, a shaft connected to said pinion and journalled parallel with said quill, means on said shaft for receiving an actuating member to turn it for effecting axial movement of said quill, clamping means disposed to contract said collar upon said quill for clamping it in adjusted position including means to receive an actuating member, and a cooperating detachable manually operable actuating member adapted to engage and actuate either said quill moving mechanism or said quill clamping means.

11. In a machine tool, a spindle head, a spindle quill slidably mounted in said spindle head, a tool spindle rotatably mounted in said quill, and means for stopping said quill at a predetermined position including a quill stop rod secured to said quill and slidably mounted in said head parallel with said quill, said stop rod functioning also to prevent rotation of said quill in said head.

12. In a machine tool, a spindle supporting head, a spindle quill slidably mounted in said head for axial movement and presenting a threaded exterior surface, a tool carrying spindle rotatably mounted in said quill, a quill adjusting nut rotatably mounted in said head in cooperating relationship with said threaded exterior of said quill, means to rotate said nut to adjust the axial position of said spindle relative to said head, and means to limit the extent of movement of said quill at a predetermined position including a stop rod secured to said quill and disposed parallel therewith for sliding movement in said head and carrying an adjustable abutment, said stop rod serving also to prevent rotation of said quill when said nut is turned in adjusting the axial position of said spindle.

13. In a machine tool, a spindle supporting structure including a spindle head, a spindle quill slidably mounted in said spindle head for axial adjustment relative thereto said quill presenting a threaded external surface, a tool carrying spindle rotatably mounted in said quill for bodily axial movement therewith, an adjusting nut cooperating with the threaded exterior of said quill, means rotatably supporting said adjusting nut in said spindle head including a contractable collar encircling said quill and secured in said head in manner to retain said adjusting nut in predetermined axial position, actuating means arranged to engage said nut to rotate it for adjusting the axial position of said quill and said spindle, and clamping means arranged to contract said collar upon said quill to clamp it in adjusted position.

14. In a machine tool, a spindle supporting structure including a spindle quill mounted for axial sliding movement said quill being provided with external screw threads, a cooperating quill adjusting nut disposed in threaded engagement with said quill, means rotatably supporting said nut including a contractable collar disposed to encircle said quill, a shaft operatively connected to actuate said quill adjusting nut, means on said shaft for receiving an actuating member to turn it for effecting axial movement of said quill, clamping means disposed to contract said collar upon said quill for clamping it in adjusted position including means to receive an actuating member, and a cooperating detachable manually operable actuating member adapted to engage and actuate either said quill moving mechanism or said quill clamping means.

15. In a machine tool, the combination with a spindle head, a spindle quill slidably mounted in said spindle head, and a tool spindle rotatably mounted in said quill, of means for stopping said quill and tool spindle at a predetermined axial position including a quill stop rod secured to said quill and slidably mounted in said head parallel with said quill, said stop rod functioning also to prevent rotation of said quill in said head, and a stop member adjustably associated with said stop rod and operative to predetermine the position at which said tool spindle is to be stopped at the termination of an axial feeding movement of said quill.

16. In a machine tool, a spindle supporting frame, a spindle quill slidably mounted in said frame for axial movement and presenting a threaded exterior surface, a tool carrying spindle rotatably mounted in said quill for axial feeding movement therewith, a quill adjusting nut rotatably mounted in said frame in cooperating relationship with the threaded exterior of said quill, means to rotate said nut to adjust the axial position of said spindle relative to said frame, and means to stop said quill at a predetermined axial position including a stop rod secured to said quill and disposed parallel therewith for sliding movement in said frame, said stop rod serving also to prevent rotation of said quill in said frame when said nut is turned in adjusting the axial position of said spindle.

17. In a machine tool, a spindle supporting structure, a spindle carrying quill slidably mounted in said structure, a tool spindle rotatably mounted in said quill, a quill positioning rod disposed parallel with and secured to said quill, means slidably receiving said rod in said supporting structure in manner to prevent rotation of said quill while permitting axial sliding movement thereof, and means associated with said positioning rod for determining the axial position of said tool spindle relative to said supporting structure.

18. In a machine tool, a spindle supporting structure, a spindle carrying quill slidably mounted in said structure, a tool spindle rotatably mounted in said quill, a quill positioning rod disposed parallel with and secured to said quill, means slidably receiving said rod in said supporting structure in manner to prevent rotation of said quill while permitting axial sliding movement thereof, and a multiple position stop device associated with said positioning rod and operative to indicate successively the arrival of said tool spindle at a plurality of predetermined axial positions.

19. In a machine tool, a frame, a tool head pivotally mounted on said frame for swiveling movement, a spindle quill slidably mounted in said head, a tool spindle rotatably mounted in said quill, a bracket extending from said quill, a gauge holding member rotatably carried by said bracket, a plurality of individually adjustable gauge elements mounted in said rotatable member, and a sensitive dial indicator mounted on said swiveling head in position to be contacted by any one of said gauge elements selectively upon rotation of said holding member, whereby said spindle may be adjusted successively to a plurality of predetermined positions with a high degree of accuracy.

20. In a milling machine having a frame, a tool carrying head pivotally mounted on said frame, a tool spindle rotatably mounted in said head with its axis transverse to the axis of pivotal movement of said head, said spindle being arranged for pivotal movement bodily with said head and for axial movement relative to said head, a spindle driving shaft rotatably mounted in said frame and extending into the back of said head coaxially with its axis of pivotal movement, means operatively connecting said driving shaft to said spindle in said head to drive it regardless of its axial or angular position, a spindle moving member rotatably mounted on the front of said head coaxially with its axis of pivotal movement, and means operatively connecting said spindle moving member to said spindle in manner to provide for effecting axial movement of said spindle in said head regardless of its angular position, said spindle moving member remaining in the same location relative to said frame for any angular position assumed by said head.

JOSEPH B. ARMITAGE.